United States Patent
Dickenson et al.

(10) Patent No.: US 10,467,813 B2
(45) Date of Patent: Nov. 5, 2019

(54) PERSONALIZED AUGMENTED REALITY USING COGNITIVE ANALYSIS

(71) Applicant: International Business Machines Corporation, Armonk, NY (US)

(72) Inventors: Marc A. Dickenson, Austin, TX (US); Igor S. Ramos, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/685,803

(22) Filed: Aug. 24, 2017

(65) Prior Publication Data

US 2019/0066379 A1 Feb. 28, 2019

(51) Int. Cl.

| | |
|---|---|
| *G06T 19/00* | (2011.01) |
| *G06F 16/9535* | (2019.01) |
| *H04N 21/234* | (2011.01) |
| *H04N 21/81* | (2011.01) |
| *H04L 29/08* | (2006.01) |
| *H04L 29/06* | (2006.01) |
| *H04N 21/442* | (2011.01) |

(52) U.S. Cl.
CPC ........ *G06T 19/006* (2013.01); *G06F 16/9535* (2019.01); *H04L 67/22* (2013.01); *H04L 67/38* (2013.01); *H04N 21/23418* (2013.01); *H04N 21/44222* (2013.01); *H04N 21/816* (2013.01)

(58) Field of Classification Search
None
See application file for complete search history.

(56) References Cited

U.S. PATENT DOCUMENTS

| | | |
|---|---|---|
| 2009/0167787 A1 | 7/2009 | Bathiche et al. |
| 2012/0317593 A1 | 12/2012 | Myslinski |
| 2015/0248619 A1 | 9/2015 | Myslinski |
| 2015/0379774 A1 | 12/2015 | Trainor |

(Continued)

OTHER PUBLICATIONS

Hamilton, Beau, "Google News Introduces Fact Check Feature Just In Time for the US Election", https://tech.slashdot.org/story/16/10/13/2344237/googlenewsintroducesfactcheckfeaturejustintimeforthe uselection, Oct. 13, 2016, 15 pages.

*Primary Examiner* — Peter Hoang
(74) *Attorney, Agent, or Firm* — Stephen R. Tkacs; Stephen J. Walder, Jr.; Richard A. Wilhelm (57) ABSTRACT

A mechanism is provided in a data processing system comprising at least one processor and at least one memory, the at least one memory comprising instructions which are executed by the at least one processor and configure the processor to implement a cognitive system for generating personalized augmented reality using cognitive analysis. A cognitive analysis engine executing within the cognitive system receives a video feed. A content extraction component of the cognitive analysis engine extracts a portion of content from the video feed. The cognitive analysis engine performs analysis on the portion of content based on personal information of a viewer and a corpus of information to form a response that is relevant to the portion of content and the viewer. A rendering objective engine executing within the cognitive system generates a rendering artifact based on the response. An image attenuation component executing within the cognitive system attenuates the rendering artifact within the video feed to form an augmented video feed.

20 Claims, 5 Drawing Sheets

(56) References Cited

U.S. PATENT DOCUMENTS

2016/0196334 A1* 7/2016 Bastide .............. G06F 16/2465
                                                     707/776
2016/0292850 A1   10/2016 Perez et al.
2016/0295038 A1   10/2016 Rao et al.

* cited by examiner

PERSONALIZED AUGMENTED REALITY USING COGNITIVE ANALYSIS

BACKGROUND

The present application relates generally to an improved data processing apparatus and method and more specifically to mechanisms for personalized augmented reality using cognitive analysis.

Mixed reality (MR), sometimes referred to as hybrid reality, is the merging of real and virtual worlds to produce new environments and visualizations where physical and digital objects co-exist and interact in real time. Mixed reality not only takes place in the physical world or the virtual world but is a mix of reality and virtual reality, encompassing both augmented reality and augmented virtual reality via immersive technology.

Augmented reality (AR) is a live direct or indirect view of a physical, real-world environment the elements of which are augmented by computer-generated sensory input such as sound, video, graphics, or global positioning system (GPS) data. Augmented reality is related to a more general concept called computer-mediated reality, in which a view of reality is modified (possibly even diminished rather than augmented) by a computer. Augmented reality enhances one's current perception of reality, whereas in contrast, virtual reality replaces the real world with a simulated one. Augmentation techniques are typically performed in real time and in semantic context with environmental elements, such as overlaying supplemental information like scores over a live video feed of a sporting event.

With the help of advanced AR technology (e.g., adding computer vision and object recognition), the information about the surrounding real world of the user becomes interactive and digitally manipulable. Information about the environment and its objects is overlaid on the real world. This information can be virtual or real, e.g., seeing other real sensed or measured information such as electromagnetic radio waves overlaid in exact alignment with where they actually are in space. Augmented reality brings out the components of the digital world into a person's perceived real world. One example is an AR Helmet for construction workers, which displays information about the construction sites.

Hardware components for augmented reality are: processor, display, sensors and input devices. Modern mobile computing devices like smartphones and tablet computers contain these elements which often include a camera and microelectromechanical system (MEMS) sensors such as accelerometer, GPS, and solid state compass, making them suitable AR platforms.

Various technologies are used in augmented reality rendering including optical projection systems, monitors, hand held devices, and display systems worn on the human body. A head-mounted display (HMD) is a display device paired to the forehead such as a harness or helmet. HMDs place images of both the physical world and virtual objects over the user's field of view. Modern HMDs often employ sensors for six degrees of freedom monitoring that allow the system to align virtual information to the physical world and adjust accordingly with the user's head movements. HMDs can provide virtual reality users mobile and collaborative experiences.

AR displays can be rendered on devices resembling eyeglasses. Versions include eyewear that employ cameras to intercept the real world view and re-display its augmented view through the eye pieces and devices in which the AR imagery is projected through or reflected off the surfaces of the eyewear lens pieces. A head-up display, also known as a HUD, is a transparent display that presents data without requiring users to look away from their usual viewpoints. A precursor technology to augmented reality, heads-up displays were first developed for pilots in the 1950s, projecting simple flight data into their line of sight thereby enabling them to keep their "heads up" and not look down at the instruments. Near eye augmented reality devices can be used as portable head-up displays as they can show data, information, and images while the user views the real world. Many definitions of augmented reality only define it as overlaying the information. This is basically what a head-up display does; however, practically speaking, augmented reality is expected to include registration and tracking between the superimposed perceptions, sensations, information, data, and images and some portion of the real world. Contact lenses that display AR imaging are in development. These bionic contact lenses might contain the elements for display embedded into the lens including integrated circuitry, light emitting diodes and an antenna for wireless communication.

Handheld displays employ a small display that fits in a user's hand. All handheld AR solutions to date opt for video see-through. Initially handheld AR employed fiducial markers, and later GPS units and MEMS sensors such as digital compasses and six degrees of freedom accelerometer-gyroscope. Handheld display AR promises to be the first commercial success for AR technologies. The two main advantages of handheld AR are the portable nature of handheld devices and the ubiquitous nature of smart phones containing cameras. The disadvantages are the physical constraints of the user having to hold the handheld device out in front of them at all times as well as the distorting effect of classically wide-angled mobile phone cameras when compared to the real world as viewed through the eye.

As used herein, the term "augmented reality" refers to any technique for augmenting a real-world environment, such as a live video captured through a camera or recorded video, using computer-generated sensory input such as sound, video, or graphics.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions which are executed by the at least one processor and configure the processor to implement a cognitive system for generating personalized augmented reality using cognitive analysis. The method comprises receiving, by a cognitive analysis engine executing within the cognitive system, a video feed. The method further comprises extracting, by a content extraction component of the cognitive analysis engine, a portion of content from the video feed. The method further comprises performing, by the cognitive analysis engine, analysis on the portion of content based on personal information of a viewer and a corpus of information to form a response that is relevant to the portion of content and the viewer. The method further comprises generating, by a rendering objective engine executing within the cognitive system, a rendering artifact based on the response. The method further comprises attenuating, by an image attenuation component executing within the cognitive system, the rendering artifact within the video feed to form an augmented video feed.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

In this age of extreme content personalization, marketing agencies and brands strive to tune messages to each potential client preference. Social channels are perfect for uniquely delivering content; however, video broadcasts still fall into the old paradigm where the same content is delivered to millions of viewers with no customization and without taking into account user preferences, demographics, and transient factors. For example, sports broadcasts have graphics added to the video feed including scores, statistics, advertising, and even enhancements, such as first down markers, strike zones, etc. Yet, these augmentations are added by the broadcaster and are viewed by all viewers. If a given viewer does not wish to view a strike zone graphic, that viewer cannot turn the graphic off. Furthermore, the augmentations are not personalized to the viewer.

In accordance with an illustrative embodiment, a mechanism is provided for analyzing the content of a video feed, gathering information from at least one corpus of information related to the content of the video feed, generating rendering artifacts based on personal information of a viewer, rendering the artifacts within the video feed, and presenting the resulting augmented video feed to the user. More particularly, the illustrative embodiment includes providing the augmented video feed using a presentation device at the client side. In one embodiment, the mechanism exists at the broadcast side; however, the mechanism may exist separately in an analysis and rendering side or, alternatively, at the client side or a combination of the above. In one embodiment, the broadcast side may be associated with a camera of the user's smart phone with the analysis and rendering side and the client side also existing within the user's smart phone. The presentation device at the client side may be a computer monitor, a smart phone device, a virtual reality headset or goggles, an augmented reality helmet or eyewear, or any current or future augmented reality device.

In the illustrative embodiment, the mechanism comprises a cognitive data processing system executing on one or more computing systems. The cognitive data processing system extracts content from the video feed and performs cognitive analysis on the extracted content. Content extraction may include, for example, speech recognition, optical character recognition, closed captioning extraction, digital lip reading, object recognition, or the like. Cognitive analysis may include, for example, natural language processing, natural language translation, image analysis and recognition, audio analysis, data analytics, tradeoff analytics, personality insights, sentiment analysis, question answering, etc. The one or more corpora of information may include personal information of the user, one or more informational databases, one or more social networks, etc. Rendering artifacts may include or be based upon, for example, factual information from trusted information sources that supports or refutes statements made in the video feed, charts or graphs or infographics concerning the extracted content, results of sentiment analysis, results of tradeoff analytics, or the like. In one embodiment, the rendering artifacts may include changes in color of objects in the video feed, highlighting of objects in the video feed, visual augmentation of objects in the video feed, addition of two-dimensional or three-dimensional overlays, modifications of sound or speech, addition or muting of sound or speech, or changes in sound volume.

In one embodiment, the mechanism renders generated artifacts based on user preferences. The user preferences may be explicitly specified in a user profile or may be derived from personal information, such as demographic information, cohort analysis, email communications, social media posts, or the like. In another embodiment, the mechanism performs cognitive analysis based on personal information of the user, such as demographic information, residential address, personality insights, financial data, personal interests, education, shopping history, travel history, or the like. The mechanism generates hypotheses based on at least one corpus of information and the personal information of the user. For instance, the mechanism may generate hypotheses regarding how content extracted from the video source relates to, affects, or will affect the user based on the user's personal information.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
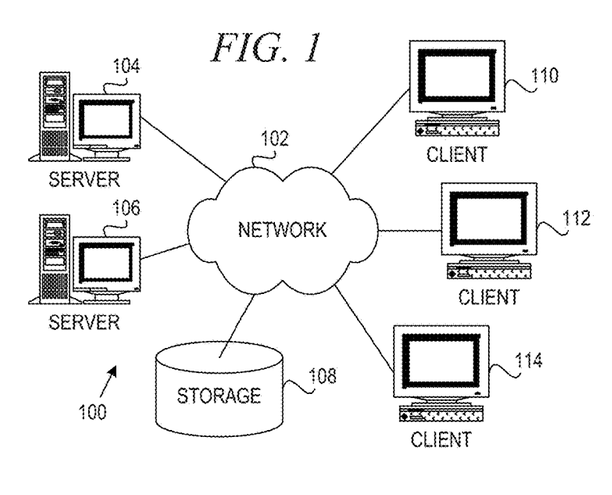
FIG. 1 is an example diagram of a distributed data processing system in which aspects of the illustrative embodiments may be implemented.
Figure 2:
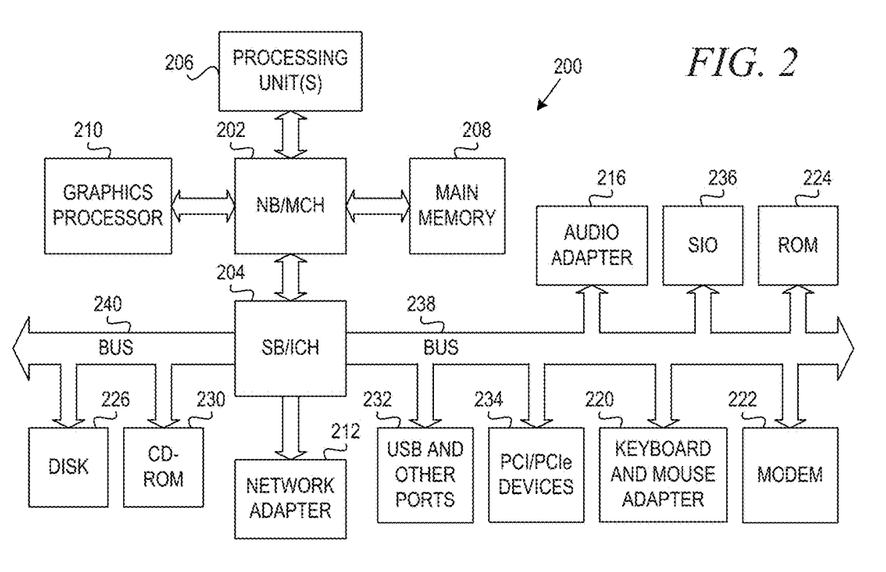
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for personalized augmented reality using cognitive analysis. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates presenting personalized augmented reality using cognitive analysis. These computing devices, or data processing systems, may comprise various hardware elements which are specifically configured, either through hardware configuration, software configuration, or a combination of hardware and software configuration, to implement one or more of the systems/subsystems described herein.

FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the mechanism for personalized augmented reality using cognitive analysis.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
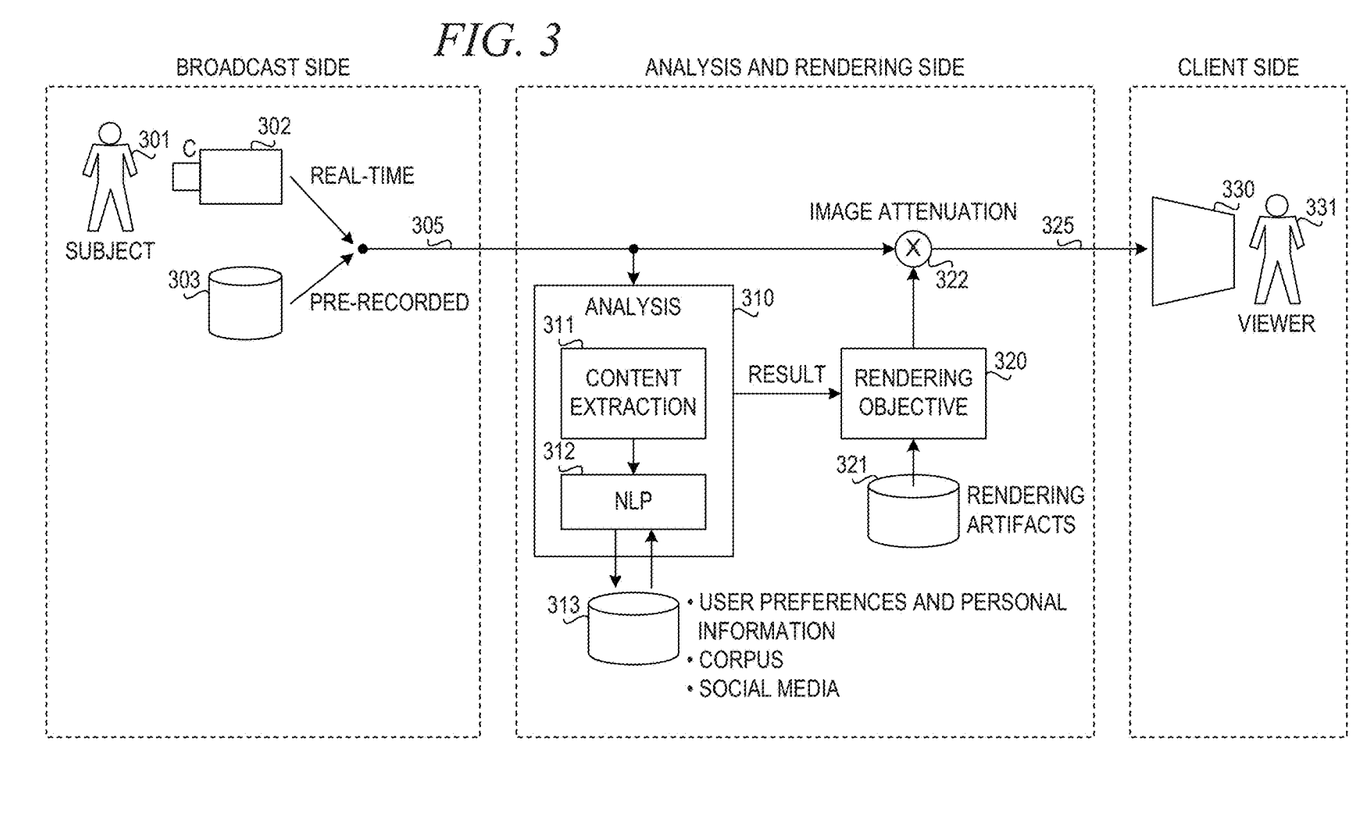
FIG. 3 is a block diagram illustrating a mechanism for personalized augmented reality using cognitive analysis in accordance with an illustrative embodiment.

FIG. 3 is a block diagram illustrating a mechanism for personalized augmented reality using cognitive analysis in accordance with an illustrative embodiment. At a broadcast side, a video feed is generated using a camera 302 or from pre-recorded video 303. Camera 302 may capture video of at least one subject 301. The generated video feed 305 contains content regarding one or more subjects with spoken language, graphic text, objects, and the like.

At the analysis and rendering side, analysis engine 310 receives the generated video feed 305. Content extraction component 311 extracts content from video feed 305. Content extraction component 311 may perform, for example, speech recognition, optical character recognition, closed captioning extraction, digital lip reading, or the like. Natural language processing component 312 performs natural language processing on the extracted content. The natural language processing may include, for example, morphological segmentation, part-of-speech tagging, parsing, lexical semantics, machine translation, named entity recognition, question answering, relationship extraction, sentiment analysis, topic segmentation and recognition, word sense disambiguation, or the like.

Analysis engine 310 performs cognitive analysis on content extracted from video feed 305 with respect to one or more corpora 313. These corpora 313 may include user preferences and personal information, one or more corpora of information, and one or more social media sources. The user preferences and personal information may include, for example, explicit user preferences concerning what types of rendering artifacts are to be generated, demographic information, education, financial information, health information and monitoring device (e.g., fitness band, smart scale, step counter, etc.) data, email content, social media postings, shopping history, travel history, etc. The one or more corpora of information may include, for example, newspapers, magazines, blogs, stock quotes and market trends, medical journals, etc. The social media sources may include social media postings, product and service reviews, article and video comments, etc.

In one embodiment, analysis engine 310 generates one or more hypotheses based on the extracted content, the personal information, and a corpus of information in corpora 313. Analysis engine 310 then gathers evidence from corpora 313 for the one or more hypotheses. Analysis engine 310 includes a plurality of scoring components that generate scores for the gathered evidence. Analysis engine 310 then determines a confidence score for the one or more hypotheses and ranks the hypotheses by confidence score to form a ranked list of responses. The highest ranked responses are provided as results to rendering objective engine 320. The responses may include portions of source documents that support statements made by subjects in the video feed, source documents that refute statements made in the video feed, social media reactions to the topics mentioned in the video feed, statistics about topics mentioned in the video feed, sentiment about topics mentioned in the video feed, etc.

For instance, if the video feed contains a political debate, and one of the debaters references a tax reform plan, the analysis engine 310 may retrieve information from the corpus of information concerning the referenced tax reform plan and also retrieve information from the user's personal information concerning the user's tax bracket and financial situation. Analysis engine 310 may then determine how the tax reform plan will specifically affect the user. For example, analysis engine 310 may generate a result as follows: "The tax reform plan may result in a 10% decrease in your next year's income taxes." As another example, analysis engine 310 may generate a projection of how the user's income taxes will change over time, which can be rendered as a graph.

Rendering objective engine 320 uses the results from analysis engine 310 to generate augmentation artifacts, which are attenuated by image attenuation component 322 in video feed 305 to form augmented video feed 325. The augmented video feed 325 is then viewed by viewer 331 using device 330 on the client side. Rendering objective engine 320 may receive and customize rendering artifacts 321 to be incorporated into video feed 305. Rendering artifacts 321 may include, for example, text boxes, graphs, charts, etc. Rendering objective engine 320 may customize rendering artifacts 321 to include results received from analysis engine 310, to form graphs and charts, to position the artifacts within the video feed 305, and so forth. Device 330 may be a two-dimensional screen, such as a television, smart phone screen, or computer monitor. Alternatively, device 330 may be a three-dimensional device, such as a virtual reality helmet or goggles, mixed reality goggles, or the like. Rendering objective engine 320 may position rendering artifacts in two or three dimensions depending on the user device 330.

In one embodiment, rendering artifacts 321 include augmentations to be made to subjects of video feed 305. For example, if subject 301 in video feed 305 makes an objectively false statement, rendering objective engine 320 may select a shading artifact or a truth meter artifact from rendering artifacts 321. As another example, if user sentiment about subject 301 is positive, rendering objective engine 320 may select a glow artifact or hearts artifact from rendering artifacts 321. These artifacts may then be used to augment the subject 301 in the augmented video feed 325. In other examples, the color of a person's clothes on the video stream may change based on social media sentiment analysis, an audio filter may be placed to ease a character's heavy accent, product placement in a movie scene may change from soft drink to beer if the viewer is of drinking age, or to modify the broadcast to show activity of friends.

Figure 4:
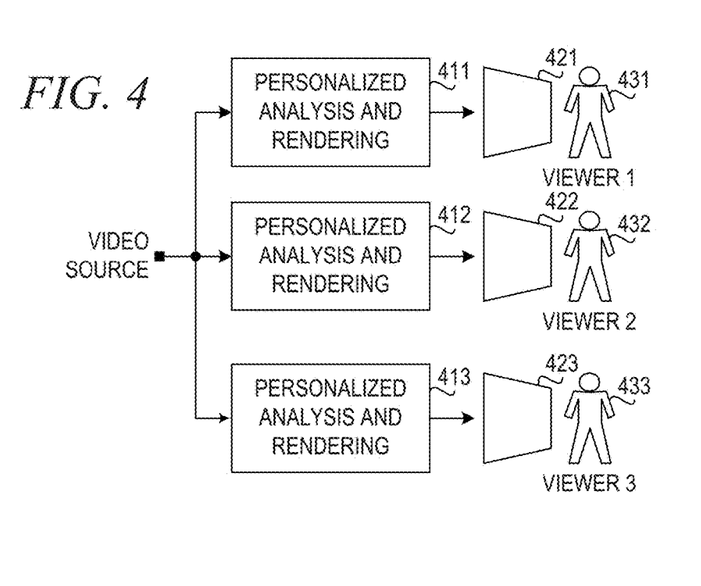
FIG. 4 is a block diagram illustrating a mechanism for personalized analysis and rendering of a video feed for a plurality of viewers in accordance with an illustrative embodiment.

FIG. 4 is a block diagram illustrating a mechanism for personalized analysis and rendering of a video feed for a plurality of viewers in accordance with an illustrative embodiment. A video source is provided to personalized analysis and rendering systems 411-413, each of which provides augmented video to a different user. That is, personalized analysis and rendering system 411 augments the video source to be displayed on device 421 for viewer 1 431, personalized analysis and rendering system 412 augments the video source to be displayed on device 422 for viewer 2 432, and personalized analysis and rendering system 413 augments the video source to be displayed on device 423 for viewer 3 433. Each viewer 431-433 sees the same video source, but it is augmented based on the personal information of the respective viewer.

Figure 5:
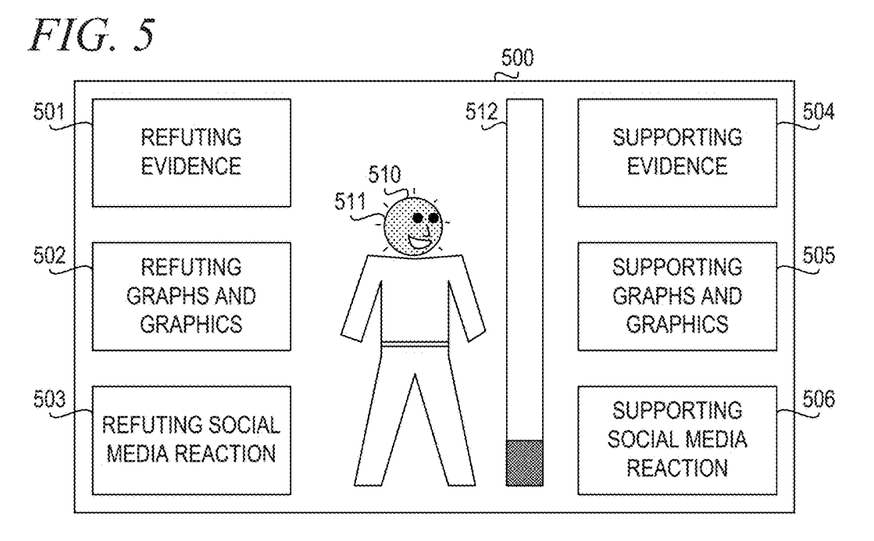
FIG. 5 depicts an example display of augmented video in accordance with an illustrative embodiment.

FIG. 5 depicts an example display of augmented video in accordance with an illustrative embodiment. In the depicted example, display 500 is a two-dimensional screen of a user's television, smart phone, or computer. Display 500 includes video featuring subject 510. Display 500 includes various rendering artifacts 501-506. More particularly, artifact 501 shows refuting evidence that refutes statements made by subject 510, artifact 502 shows refuting graphs and graphics that refute statements made by subject 510, artifact 503 shows refuting social media reaction about topics within the video, artifact 504 shows supporting evidence that supports statements made by subject 510, artifact 505 shows supporting graphs and graphics that support statements made by subject 520, and artifact 506 shows supporting social media reaction about topics within the video.

As shown in FIG. 5, display 500 shows subject 510 modified with rendering artifacts. For example, artifact 511 is a shading artifact that indicates subject 510 is making a statement that is overwhelmingly refuted by the evidence in the corpora. Shading artifact 511 changes a color or intensity of light or color to indicate whether the subject 510 is telling a truthful or false statement. For example, shading artifact 511 may color the subject's face green to indicate a truthful statement and red to indicate a false statement. Alternatively, shading artifact 511 may cause the subject's face to pulsate with red light for a statement that has a truth confidence value below a predetermined threshold and with an intensity that is inversely proportional to the truth confidence value. As another example, artifact 512 is a truth meter artifact that visually depicts a confidence that a statement is true or false.

Figure 6:
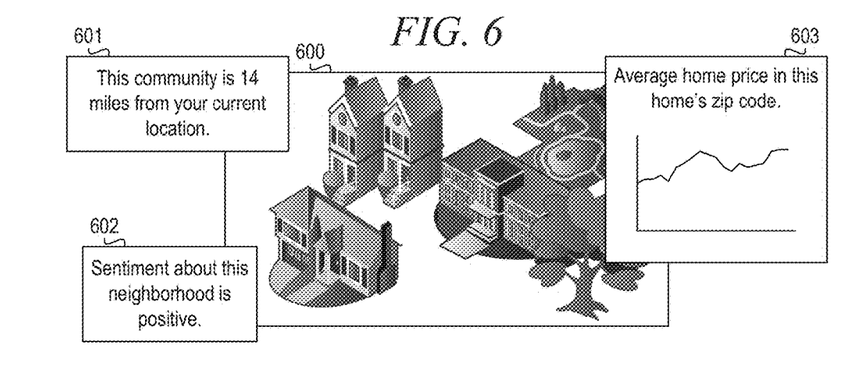
FIG. 6 depicts an example screen of a video with personalized augmentations in accordance with an illustrative embodiment.

FIG. 6 depicts an example screen of a video with personalized augmentations in accordance with an illustrative embodiment. In the depicted example display 600 contains video from a real estate program about a particular neighborhood with homes for sale. The mechanism of the illustrative embodiment performs cognitive analysis on the video to identify a community name spoken in the video and names of home models in the digital graphics of the video. The mechanism of the illustrative embodiment determines that the community is 14 miles from the viewer's current residential address, determines that the sentiment about the neighborhood is positive on social media, and determines that home prices in the zip code of the neighborhood are on an upward trend. The mechanism of the illustrative embodiment then generates augmentation artifacts 601-603, which correspond to the findings of cognitive analysis and are placed in three-dimensional space in video 600.

In an example embodiment, display 600 is a two-dimensional display viewed using a mixed reality headset or goggles. An example of a mixed reality headset is HoloLens™ from Microsoft Corporation. As shown in FIG. 6, the artifacts 601-603 are arranged in three-dimensional space around display 600. Thus, to the viewer it appears that artifacts 601-603 are floating in space around the screen 600.

Figure 7:
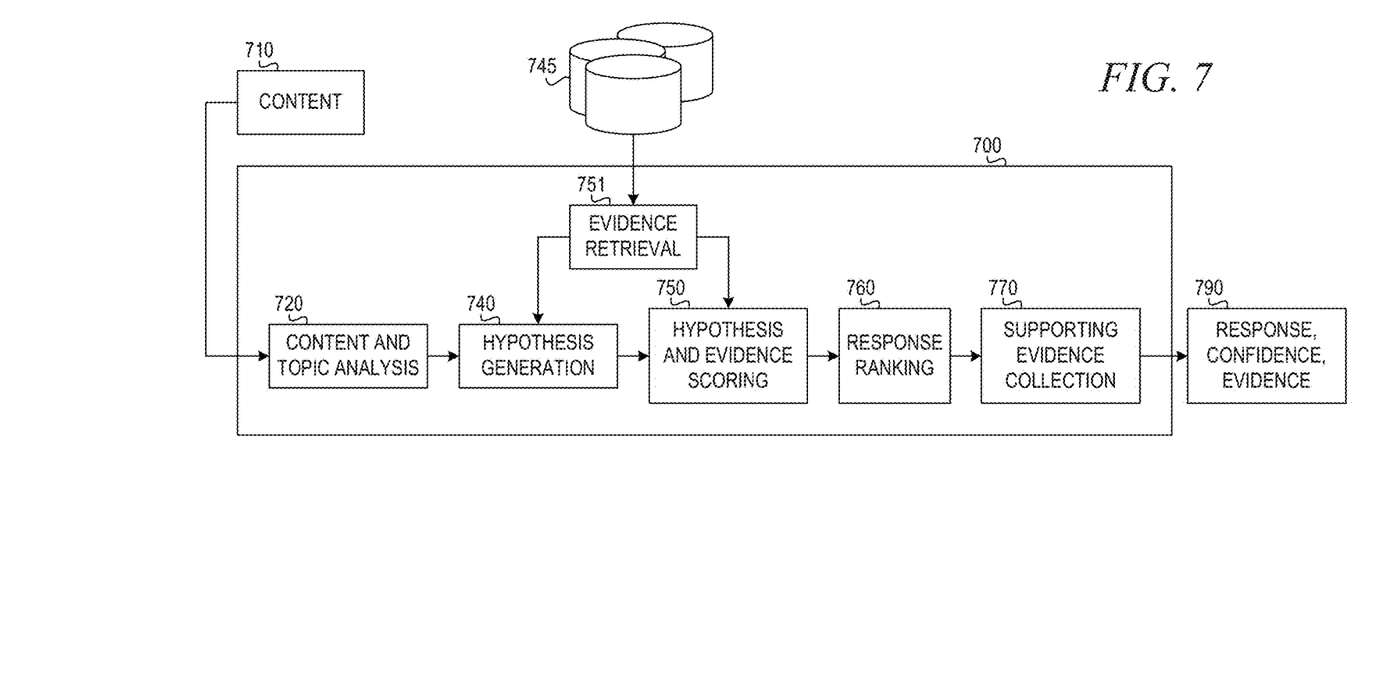
FIG. 7 illustrates a cognitive analysis data processing system pipeline for processing input content and generating responses in accordance with one illustrative embodiment.

FIG. 7 is directed to describing an example cognitive analysis data processing system, methodology, and computer program product with which the mechanisms of the illustrative embodiments are implemented. As will be discussed in greater detail hereafter, the illustrative embodiments are integrated in, augment, and extend the functionality of these cognitive analysis processing mechanisms.

With respect to the example embodiment of a cognitive analysis data processing system, also referred to herein as a cognitive system, it is important to first have an understanding of how cognitive analysis is implemented before describing how the mechanisms of the illustrative embodiments are integrated in and augment such cognitive systems. It should be appreciated that the mechanisms described in FIG. 7 are only examples and are not intended to state or imply any limitation with regard to the type of cognitive analysis processing mechanisms with which the illustrative embodiments are implemented. Many modifications to the example cognitive analysis data processing system shown in FIG. 7 may be implemented in various embodiments of the present invention without departing from the spirit and scope of the present invention.

As an example of cognitive analysis data processing, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledge-base) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question, which is then interpreted by the QA system and providing a response containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, analyzes the question to extract the major elements of the question, uses the extracted element to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of scoring algorithms. There may be hundreds or even thousands of scoring algorithms applied, each of which performs different analysis, e.g., comparisons, natural language analysis, lexical analysis, or the like, and generates a score. For example, some scoring algorithms may look at the matching of terms and synonyms within the language of the input question and the found portions of the corpus of data. Other scoring algorithms may look at temporal or spatial features in the language, while others may evaluate the source of the portion of the corpus of data and evaluate its veracity.

The scores obtained from the various scoring algorithms indicate the extent to which the potential response is likely to be a correct answer to the input question based on the specific area of focus of that scoring algorithm. Each resulting score is then weighted against a statistical model, which is used to compute the confidence that the QA system has regarding the evidence for a candidate answer being the correct answer to the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, etc.). Conventional question answering systems are capable of generating answers based on the corpus of data and the input question, verifying answers to a collection of questions from the corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information usable by the QA system to identify these question-and-answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 7 illustrates a cognitive analysis data processing system pipeline for processing input content and generating responses in accordance with one illustrative embodiment. It should be appreciated that the stages of the cognitive analysis data processing system pipeline shown in FIG. 7 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems.

In the depicted example, cognitive system pipeline 700 is implemented in a mechanism for personalized augmented reality. As shown in FIG. 7, the cognitive system pipeline 700 comprises a plurality of stages 710-790 through which the cognitive system operates to analyze an input content and generate a final response. In an initial question input stage, the cognitive system receives an input content 710 that is presented in a natural language format. In response to receiving the input content 710, the next stage of the cognitive system pipeline 700, i.e. the content and topic analysis stage 720, analyzes the input content using natural language processing (NLP) techniques to extract major elements from the input content, and classify the major elements according to types, e.g., names, dates, or any of a plethora of other defined topics.

In addition, the extracted major features include key words and phrases classified into characteristics, such as the focus of the content, the lexical answer type (LAT) of the content, and the like. As referred to herein, a lexical answer type (LAT) is a word in, or a word inferred from, the input content that indicates the type of the response, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of attention deficit disorder with relatively few side effects?," the focus is "What drug" since if this phrase were replaced with the answer it would generate a true sentence, e.g., the answer "Adderall" can be used to replace the phrase "What drug" to generate the sentence "Adderall has been shown to relieve the symptoms of attention deficit disorder with relatively few side effects." The focus often, but not always, contains the LAT. On the other hand, in many cases it is not possible to infer a meaningful LAT from the focus.

Referring again to FIG. 7, the identified major elements of the content are then used during a hypothesis generation stage 740 to decompose the content into one or more search queries that are applied by evidence retrieval 751 to the corpora of data/information 745 in order to generate one or more hypotheses. The queries are applied to one or more text indexes storing information about the electronic texts, documents, articles, websites, and the like, that make up the corpus of data/information, e.g., the corpora 313 in FIG. 3. The queries are applied to the corpora of data/information at the hypothesis generation stage 740 to generate results identifying potential hypotheses for providing a response, which can then be evaluated. That is, the application of the queries results in the extraction of portions of the corpora of data/information matching the criteria of the particular query. These portions of the corpora are then analyzed and used in the hypothesis generation stage 740, to generate hypotheses for generating a response to the input content 710. These hypotheses are also referred to herein as "candidate responses" for the input content. For any input content, at this stage 740, there may be hundreds of hypotheses or candidate answers generated that may need to be evaluated.

The cognitive system pipeline 700, in stage 750, then performs a deep analysis and comparison of the language of the input content and the language of each hypothesis or "candidate response," as well as performs evidence scoring to evaluate the likelihood that the particular hypothesis is a correct response for the input content. This involves evidence retrieval 751, which retrieves passages from corpora 745.

Hypothesis and evidence scoring phase 750 uses a plurality of scoring algorithms, each performing a separate type of analysis of the language of the input question and/or content of the corpus that provides evidence in support of, or not in support of, the hypothesis. Each scoring algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

For example, an algorithm may be configured to look for the exact term from an input content or synonyms to that term in the input content, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input content.

It should be appreciated that this is just one simple example of how scoring can be performed. Many other algorithms of various complexities may be used to generate scores for candidate answers and evidence without departing from the spirit and scope of the present invention.

In response ranking stage 760, the scores generated by the various scoring algorithms are synthesized into confidence scores or confidence measures for the various hypotheses. This process involves applying weights to the various scores, where the weights have been determined through training of the statistical model employed by the system and/or dynamically updated. For example, the weights for scores generated by algorithms that identify exactly matching terms and synonyms may be set relatively higher than other algorithms that evaluate publication dates for evidence passages.

The weighted scores are processed in accordance with a statistical model generated through training of the cognitive system that identifies a manner by which these scores may be combined to generate a confidence score or measure for the individual hypotheses or candidate responses. This confidence score or measure summarizes the level of confidence that the cognitive system has about the evidence that the candidate answer is inferred by the input content, i.e. that the candidate response is a relevant response for the input content.

The resulting confidence scores or measures are processed by response ranking stage 760, which compares the confidence scores and measures to each other, compares them against predetermined thresholds, or performs any other analysis on the confidence scores to determine which hypotheses/candidate responses are the most likely to be relevant responses to the input content. The hypotheses/candidate responses are ranked according to these comparisons to generate a ranked listing of hypotheses/candidate responses.

Supporting evidence collection phase 770 collects evidence that supports the candidate responses from response ranking phase 760. From the ranked listing of candidate responses in stage 760 and supporting evidence from supporting evidence collection stage 770, cognitive system pipeline 700 generates a final response, confidence score, and evidence 790, or final set of candidate responses with confidence scores and supporting evidence, and outputs response, confidence, and evidence 790.

Thus, input content 710 may be content extracted from a video feed. Corpora 745 may the corpora 313 in FIG. 3, which include user preferences and personal information, corpora of resource information, and social media postings. The resulting responses 790 may be results to be provided to rendering objective engine 320 in FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
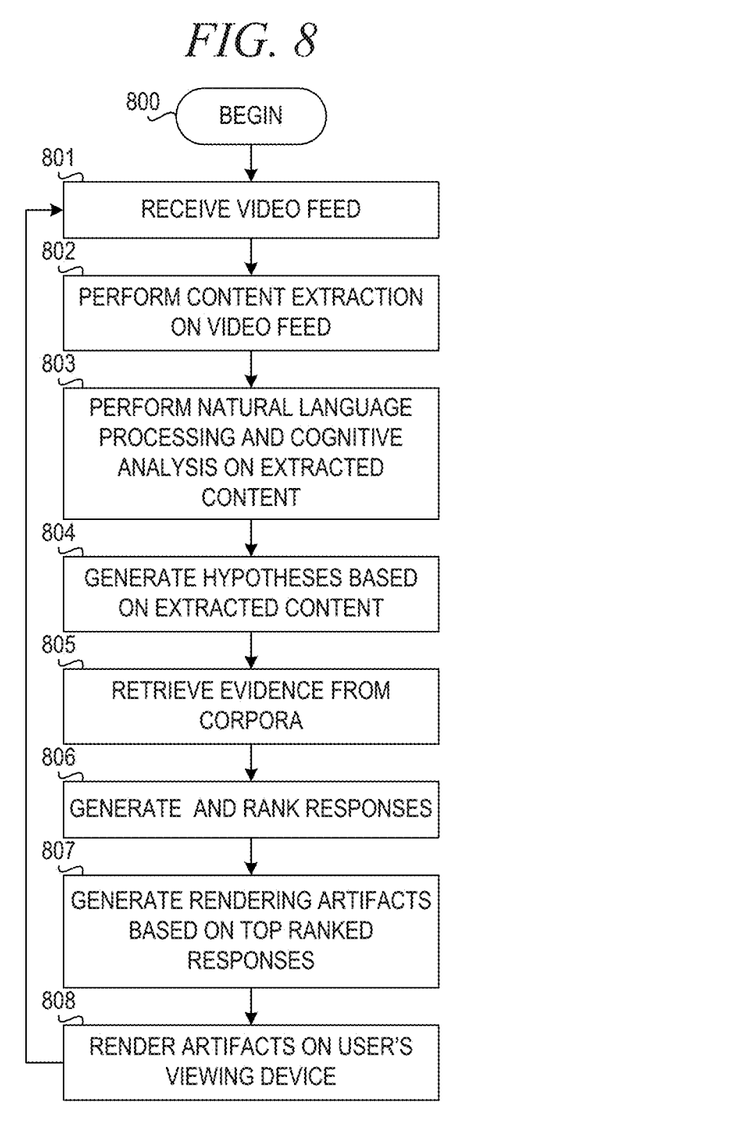
FIG. 8 is a flowchart illustrating operation of a mechanism for personalized augmentation reality using cognitive analysis in accordance with an illustrative embodiment.

FIG. 8 is a flowchart illustrating operation of a mechanism for personalized augmentation reality using cognitive analysis in accordance with an illustrative embodiment. Operation begins (block 800), and the mechanism receives a video feed (block 801). The mechanism performs content extraction on the video feed (block 802) and performs natural language processing and cognitive analysis on the extracted content (block 803). The mechanism then generates hypotheses based on the extracted content and the results of the natural language processing and cognitive analysis (block 804).

The mechanism then retrieves evidence from the corpora (block 805) and generates and ranks responses (block 806). The mechanism generates rendering artifacts based on the top ranked responses (block 807) and renders the artifacts on the user's viewing device (block 808). Thereafter, operation returns to block 801 to continue receiving and augmenting the video feed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor and configure the processor to implement a cognitive system for generating personalized augmented reality using cognitive analysis, the method comprising:

receiving, by a cognitive analysis engine executing within the cognitive system, a video feed;

extracting, by a content extraction component of the cognitive analysis engine, a portion of content from the video feed;

performing, by the cognitive analysis engine, analysis on the portion of content based on personal information of a viewer and a corpus of information to form a response including augmented content from the corpus of information augmenting the portion of content that is relevant to the viewer based on the personal information, wherein the corpus of information comprises one or more social networks and wherein the augmented content from the corpus of information is not present in the portion of content;

generating, by a rendering objective engine executing within the cognitive system, a supporting evidence rendering artifact presenting supporting evidence from the corpus of information that supports the portion of content, a refuting evidence rendering artifact presenting refuting evidence from the corpus of information that refutes the portion of content, and a social media sentiment rendering artifact representing sentiment analysis of social media postings about the portion of content based on the response; and attenuating, by an image attenuation component executing within the cognitive system, the supporting evidence rendering artifact, the refuting evidence rendering artifact, and the social media sentiment rendering artifact within the video feed to form an augmented video feed.

2. The method of claim 1, wherein extracting the portion of content from the video feed comprises performing speech recognition, optical character recognition, closed captioning extraction, digital lip reading, or object recognition on the video feed.

3. The method of claim 1, wherein performing analysis on the portion of content comprises performing, by a natural language processing component of the cognitive analysis engine, natural language processing on the content.

4. The method of claim 1, wherein performing analysis on the portion of content comprises performing data analytics, tradeoff analytics, personality insights, sentiment analysis, or question answering based on the portion of content and the personal information.

5. The method of claim 1, wherein generating the rendering artifact comprise generating addition of two-dimensional or three-dimensional overlays.

6. The method of claim 1, wherein the personal information of the viewer comprises demographic information, a residential address, personality traits, financial data, education, shopping history, or travel history of the viewer.

7. The method of claim 1, wherein generating the rendering artifact comprises generating the rendering artifact based on user preferences.

8. The method of claim 7, wherein the user preferences are explicitly specified in a user profile.

9. The method of claim 7, wherein the user preferences are derived from demographic information, cohort analysis, email communications, or social media posts.

10. An apparatus comprising:

at least one processor; and a memory coupled to the at least one processor, wherein the memory comprises instructions which, when executed by the at least one processor, cause the processor to implement a cognitive system for generating personalized augmented reality using cognitive analysis, wherein the instructions cause the at least one processor to:

receive, by a cognitive analysis engine executing within the cognitive system, a video feed;

extract, by a content extraction component of the cognitive analysis engine, a portion of content from the video feed;

perform, by the cognitive analysis engine, analysis on the portion of content based on personal information of a viewer and a corpus of information to form a response including information from the corpus of information augmenting the portion of content that is relevant to the viewer based on the personal information, wherein the corpus of information comprises one or more social networks and wherein the augmented content from the corpus of information is not present in the portion of content;

generate, by a rendering objective engine executing within the cognitive system, a supporting evidence rendering artifact presenting supporting evidence from the corn s of information that supports the portion of content, a refuting evidence rendering artifact presenting refuting evidence from the corpus of information that refutes the portion of content, and a social media sentiment rendering artifact representing sentiment analysis of social media postings about the portion of content based on the response; and attenuate, by an image attenuation component executing within the cognitive system, the rendering artifact within the video feed to form an augmented video feed.

11. The apparatus of claim 10, wherein extracting the portion of content from the video feed comprises performing speech recognition, optical character recognition, closed captioning extraction, digital lip reading, or object recognition on the video feed.

12. The apparatus of claim 10, wherein performing analysis on the portion of content comprises performing, by a natural language processing component of the cognitive analysis engine, natural language processing on the content.

13. The apparatus of claim 10, wherein performing analysis on the portion of content comprises performing data analytics, tradeoff analytics, personality insights, sentiment analysis, or question answering based on the portion of content and the personal information.

14. The apparatus of claim 10, wherein the personal information of the viewer comprises demographic information, a residential address, personality traits, financial data, education, shopping history, or travel history of the viewer.

15. The apparatus of claim 10, wherein generating the rendering artifact comprises generating the rendering artifact based on user preferences explicitly specified in a user profile, wherein the user preferences are derived from demographic information, cohort analysis, email communications, or social media posts.

16. A computer program product comprising a computer readable storage medium having a computer readable program stored therein, wherein the computer readable program, when executed on a computing device, causes the computing device to implement a cognitive system for generating personalized augmented reality using cognitive analysis, wherein the computer readable program causes the computing device to:

receive, by a cognitive analysis engine executing within the cognitive system, a video feed;

extract, by a content extraction component of the cognitive analysis engine, a portion of content from the video feed;

perform, by the cognitive analysis engine, analysis on the portion of content based on personal information of a viewer and a corpus of information to form a response including information from the corpus of information augmenting the portion of content that is relevant to the viewer based on the personal information, wherein the corpus of information comprises one or more social networks and wherein the augmented content from the corpus of information is not present in the portion of content;

generate, by a rendering objective engine executing within the cognitive system, a supporting evidence rendering artifact presenting supporting evidence from the corpus of information that supports the portion of content, a refuting evidence rendering artifact presenting refuting evidence from the corpus of information that refutes the portion of content, and a social media sentiment rendering artifact representing sentiment analysis of social media postings about the portion of content based on the response; and attenuate, by an image attenuation component executing within the cognitive system, the rendering artifact within the video feed to form an augmented video feed.

17. The computer program product of claim 16, wherein extracting the portion of content from the video feed comprises performing speech recognition, optical character recognition, closed captioning extraction, digital lip reading, or object recognition on the video feed.

18. The computer program product of claim 16, wherein performing analysis on the portion of content comprises performing, by a natural language processing component of the cognitive analysis engine, natural language processing on the content.

19. The computer program product of claim 16, wherein performing analysis on the portion of content comprises performing data analytics, tradeoff analytics, personality insights, sentiment analysis, or question answering based on the portion of content and the personal information.

20. The computer program product of claim 16, wherein the personal information of the viewer comprises demographic information, a residential address, personality traits, financial data, education, shopping history, or travel history of the viewer.

* * * * *